United States Patent
Hosseini et al.

(10) Patent No.: US 11,061,140 B2
(45) Date of Patent: Jul. 13, 2021

(54) WAVELENGTH DIVISION MULTIPLEXED LIDAR

(71) Applicant: ANALOG PHOTONICS LLC, Boston, MA (US)

(72) Inventors: Ehsan Hosseini, Milton, MA (US); Michael Watts, Hingham, MA (US); Christopher Poulton, Boston, MA (US); Diedrik Vermeulen, Boston, MA (US)

(73) Assignee: Analog Photonics LLC, Boston, MA (US)

( * ) Notice: Subject to any disclaimer, the term of this patent is extended or adjusted under 35 U.S.C. 154(b) by 479 days.

(21) Appl. No.: 15/963,032

(22) Filed: Apr. 25, 2018

(65) Prior Publication Data

US 2018/0306925 A1 Oct. 25, 2018

Related U.S. Application Data

(60) Provisional application No. 62/490,000, filed on Apr. 25, 2017.

(51) Int. Cl.
*G01S 17/89* (2020.01)
*G02B 27/28* (2006.01)
*G01S 7/481* (2006.01)
*G01S 17/42* (2006.01)

(52) U.S. Cl.
CPC ............ *G01S 17/89* (2013.01); *G01S 7/4813* (2013.01); *G01S 7/4814* (2013.01); *G01S 7/4816* (2013.01); *G01S 7/4817* (2013.01); *G01S 17/42* (2013.01); *G02B 27/283* (2013.01); *G02B 27/286* (2013.01)

(58) Field of Classification Search
CPC ................. G02F 1/2955; G02F 1/3136; G02F 2001/311; G02F 2201/06; G02F 2201/02; G02F 2203/70; G02F 2201/302
See application file for complete search history.

(56) References Cited

U.S. PATENT DOCUMENTS

| | | | |
|---|---|---|---|
| 9,740,079 B1* | 8/2017 | Davids | H04B 10/1123 |
| 2007/0215795 A1 | 9/2007 | Kameyama et al. | |
| 2014/0158870 A1 | 6/2014 | DeAntonio et al. | |
| 2014/0233013 A1 | 8/2014 | Sakimura et al. | |
| 2015/0109603 A1 | 4/2015 | Kim et al. | |
| 2015/0378012 A1* | 12/2015 | Sayyah | G01S 17/34 356/4.01 |
| 2017/0371227 A1* | 12/2017 | Skirlo | G02F 1/2955 |
| 2018/0107091 A1* | 4/2018 | Hosseini | G02F 1/292 |

* cited by examiner

*Primary Examiner* — Luke D Ratcliffe
(74) *Attorney, Agent, or Firm* — Young Basile Hanlon & MacFarlane, P.C.

(57) ABSTRACT

Aspects of the present disclosure describe wavelength division multiplexed LiDAR systems, methods, and structures that advantageously provide a wide field of view without employing lasers having a large tuning range.

18 Claims, 14 Drawing Sheets

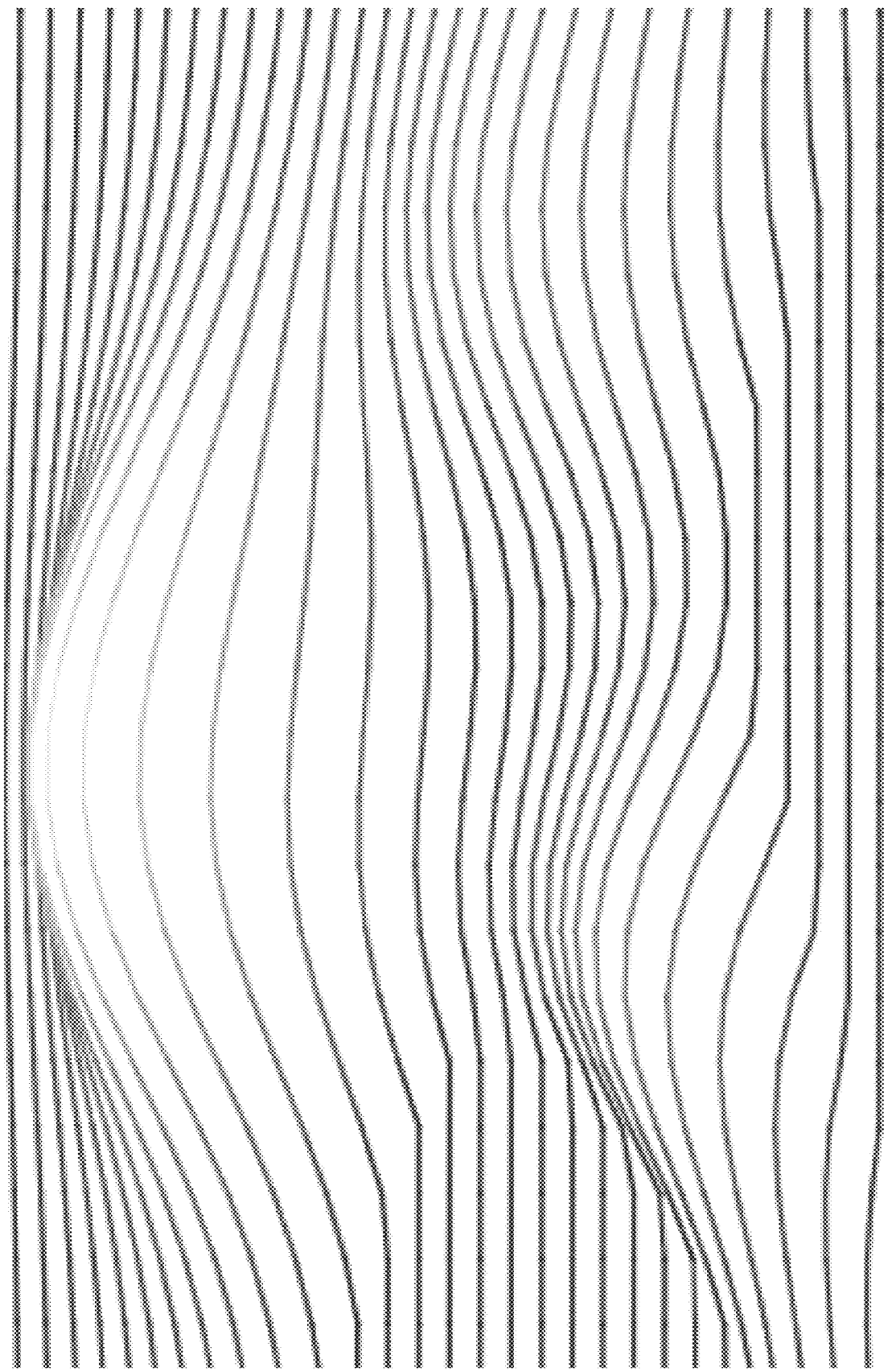

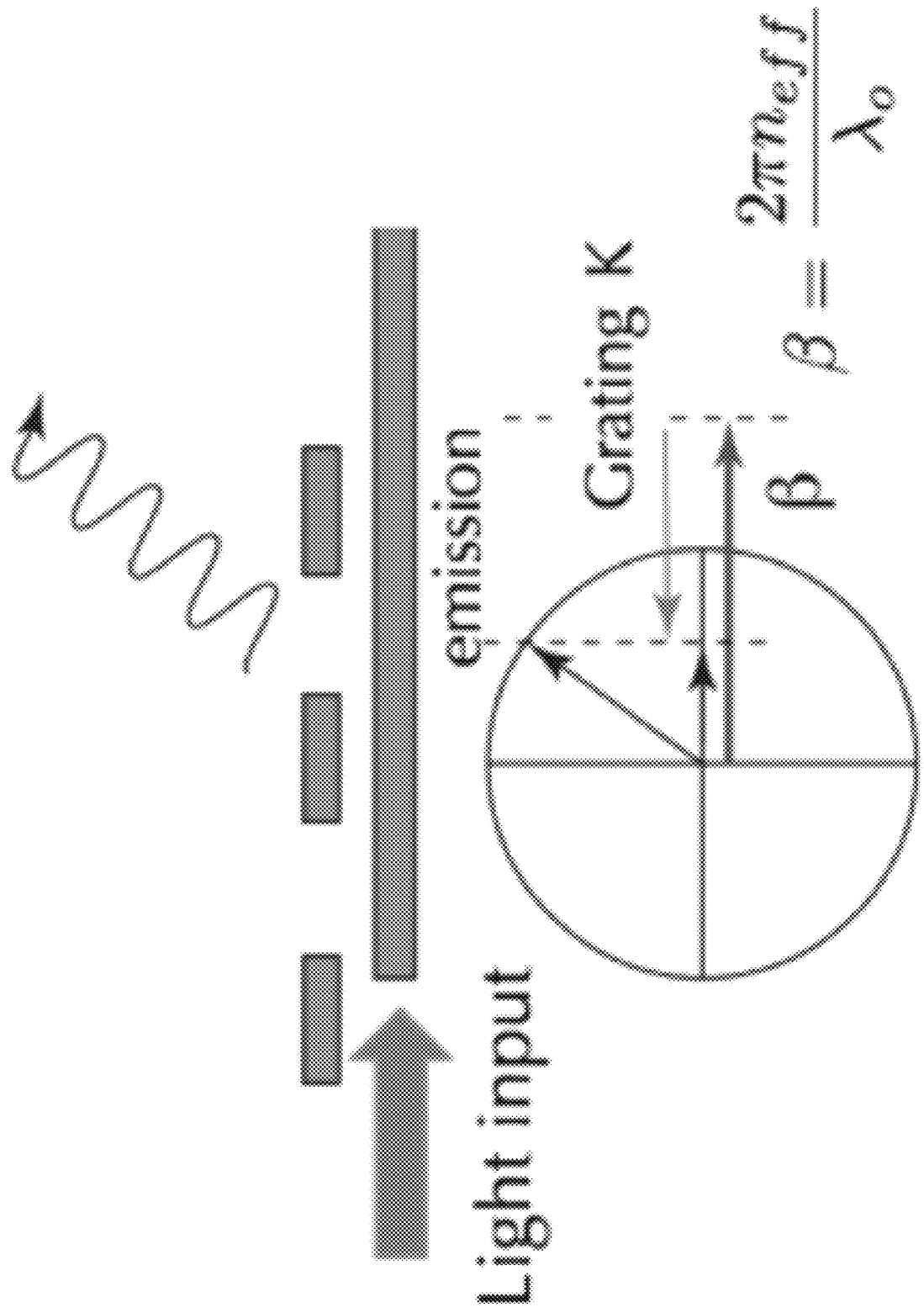

WAVELENGTH DIVISION MULTIPLEXED LIDAR

CROSS REFERENCE TO RELATED APPLICATIONS

This application claims the benefit of Untied States Provisional Patent Application Ser. No. 62/490,000 filed 25 Apr. 2017 which is incorporated by reference as if set forth at length herein.

TECHNICAL FIELD

This disclosure relates generally to scanning optical ranging and detection systems, methods, and structures. More particularly, it pertains to light detection and ranging (LiDAR) systems, methods, and structures employing wavelength division multiplexing (WDM) techniques.

BACKGROUND

The ability to measure distance and reflectivity of objects within an environment without physically touching those objects is of great interest to many fields. LiDAR—is a distance range measurement technique in which laser light is emitted and a reflected light is detected. A measured time between emission and detection of the reflected light (time of flight) corresponds to a distance between the LiDAR detector and the reflective object.

Given the utility of LiDAR in contemporary applications, further development and/or improvement of LiDAR systems, methods, and structures would represent a welcome addition to the art.

SUMMARY

An advance in the art is made according to aspects of the present disclosure directed to wavelength division multiplexed LiDAR systems, methods, and structures that advantageously provide a wide field of view without employing lasers having a large tuning range. In particular, systems, methods, and structures according to the present disclosure employ a multiwavelength beam comprising the output of a plurality of individual lasers. The individual wavelengths comprising the multiwavelength beam are separated out into individual beams—these separate wavelength beams forming individual scan lines. The individual scan lines are collectively scanned over an area thereby providing an effective 2D scan over that area.

In a simplified, illustrative embodiment, a wavelength division multiplexed LiDAR system constructed according to aspects of the present disclosure include a substrate; a multiwavelength light source attached to the substrate; an active optical phased array including phase shifters and grating emitters; and an optical splitter network that optically connects the multiwavelength light source to the active optical phased array.

Such wavelength division multiplexing LiDAR arrangements may advantageously provide ranging, sensing, imaging, and detecting capabilities for any of a number of contemporary applications.

Advantageously, systems, methods, and structures according to the present disclosure may be fabricated using contemporary CMOS techniques, and integrated onto a single substrate.

In illustrative embodiments the emitters may be arranged in a curved pattern at the focal plane of a lens thereby allowing the directional control of emitted light and selective reception of reflected light suitable for use in imaging, ranging, and sensing applications including accident avoidance.

BRIEF DESCRIPTION OF THE DRAWING

A more complete understanding of the present disclosure may be realized by reference to the accompanying drawing in which:

FIG. 1(B) is a topography map showing an illustrative map produced by steering in a single dimension with multiple scan lines in which the scan in the sideways direction is continuous while features in up/down direction are discrete according to aspects of the present disclosure;

FIG. 3(A) is a schematic illustrating emission angle dependence on wavelength due to Bragg condition according to aspects of the present disclosure;

FIG. 5(A) and FIG. 5(B) are schematic diagrams of a bulk optics wavelength multiplexed LiDAR system with: FIG. 5(A) reflective and FIG. 5(B) transmission grating, to create scan lines with a scanning mirror for continuous scanning in the other dimension according to aspects of the present disclosure;

Figure 1A:
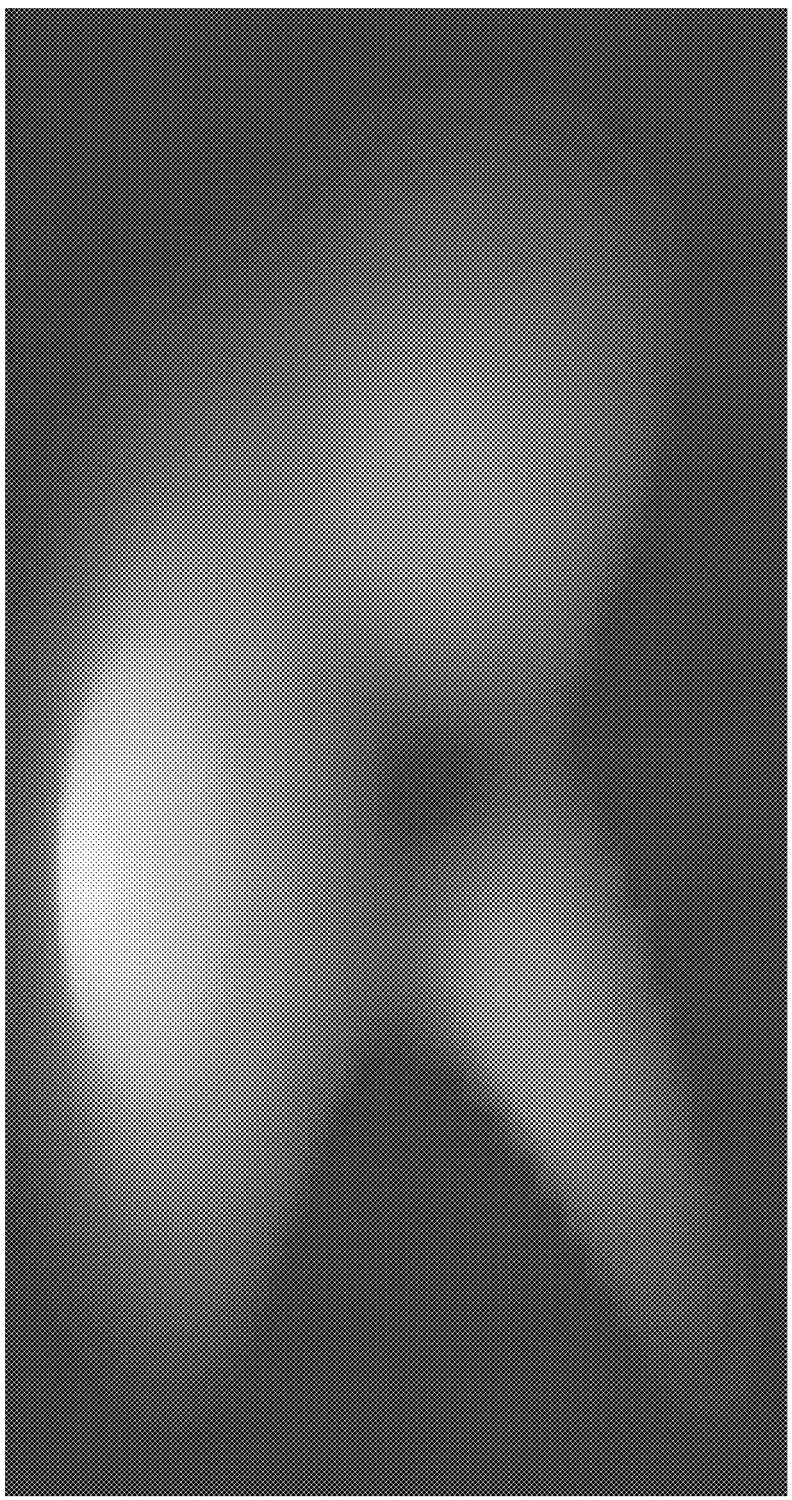
FIG. 1(A) is a topography map showing an illustrative image produced by a beam that is continuously steerable in to directions of a 2D raster scan according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

As is known, photonic phased arrays have attracted considerable attention recently for use in LiDAR applications as their ability to emit steerable phase fronts without moving parts is particularly attractive. Their attractiveness is further increased when one considers that advanced lithography, etching and other state-of-the-art manufacturing techniques developed for CMOS applications may be applied to their manufacture.

As we shall show and describe, we have further increased the attractiveness of photonic phased arrays for use in LiDAR and other applications including imaging, ranging, and sensing—among others—by advantageously extending their field of view (FOV) without using lasers having extremely large tuning range(s).

At this point we note that a LiDAR—or other system—may be constructed and configured such that it scans a scene within its FOV continuously in two dimensions. However, scanning a scene in two dimensions requires at least two different scanning apparatuses/mechanisms and requires more time since there is a 2-Dimensional space to be scanned. An alternative method to scan a scene is to employ a scan line technique which ranges multiple points simultaneously in one dimension and then scans these multiple points in another dimension. While this scan line technique reconstructs discretely the scene in only one dimension—it advantageously requires only one scanning mechanism and is less time consuming as compared with the mentioned 2D method(s).

Operational result(s) of such techniques may be seen with reference to FIG. 1(A) and FIG. 1(B), in which there is shown: FIG. 1(A) a topography as would be imaged with a beam that is continuously steerable in both directions and two-dimensionally raster scans a scene; and FIG. 1(B) a topography made from steering in one-dimension with multiple scan lines wherein the scan in a sideways direction is continuous while features in the up/down directions are discrete.

Figure 2A:
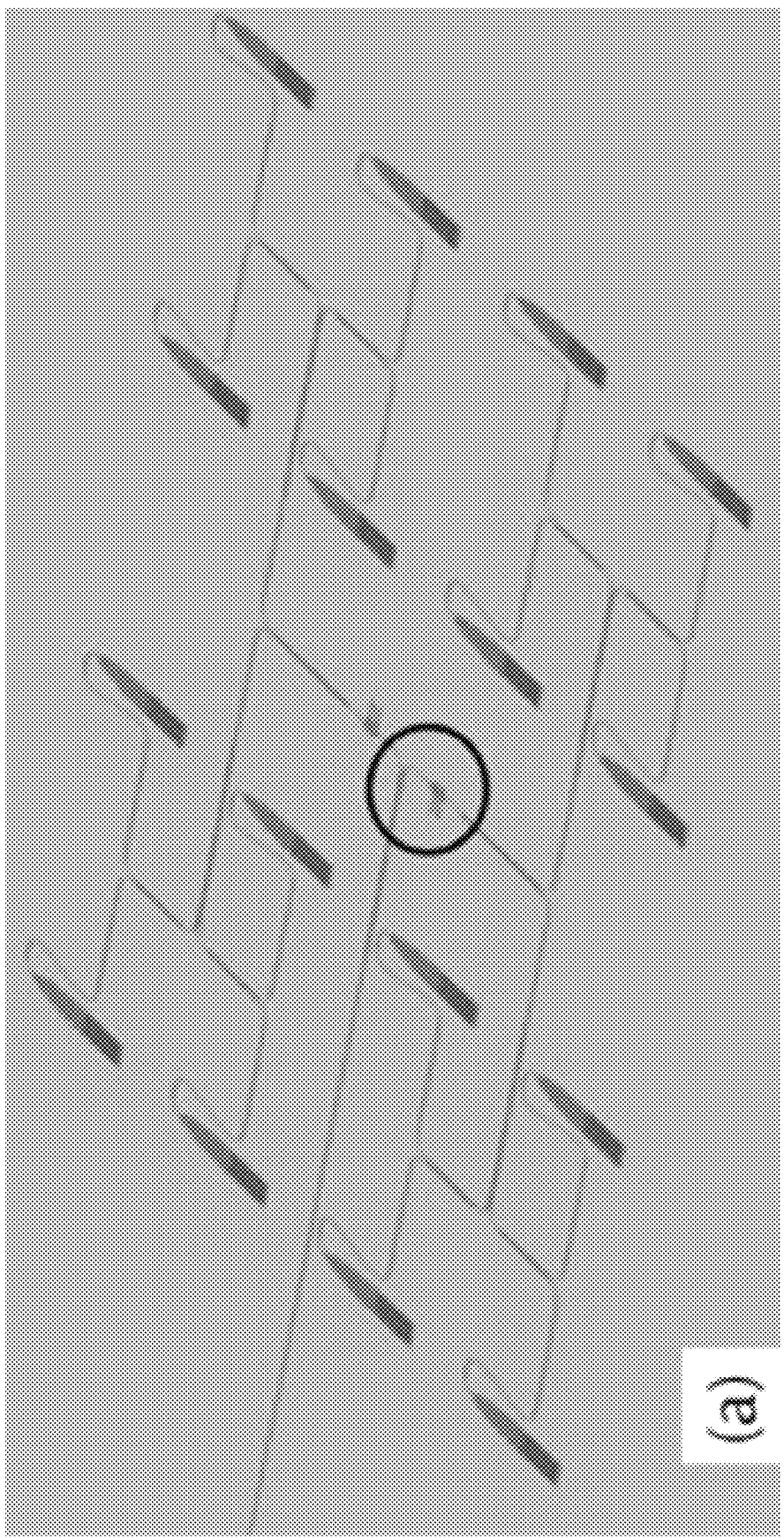
FIG. 2(A) is a schematic diagram of an illustrative two-dimensional array of emitters with phase shifters that may steer light in multiple directions using a single frequency laser in which emitter compactness and number of side lobes is problematic according to aspects of the present disclosure.

We note that for an optical phased array to continuously scan in two dimensions, a 2D phased array (see, FIG. 2(A)) may be used with a single wavelength laser and an array of emitters arranged in a 2D array. By adjusting the phase of the emitters, one can steer emissions in both transverse and azimuthal directions. One significant drawback of such 2D arrays is that the emitters cannot be packed into a grid exhibiting a size less than $\lambda/2$ as all grating emitters, tapers, and splitters are several times larger than the wavelength of the emissions. Note further that whenever a system exhibits a periodicity greater than $\lambda/2$, aliasing effect(s) lead to one or more side-lobes showing up in the array factor. Consequently, the overall array radiates (and receives) into (from) several spatial directions which disadvantageously reduces the FOV, and introduces loss and false detections to the system.

Figure 2B:
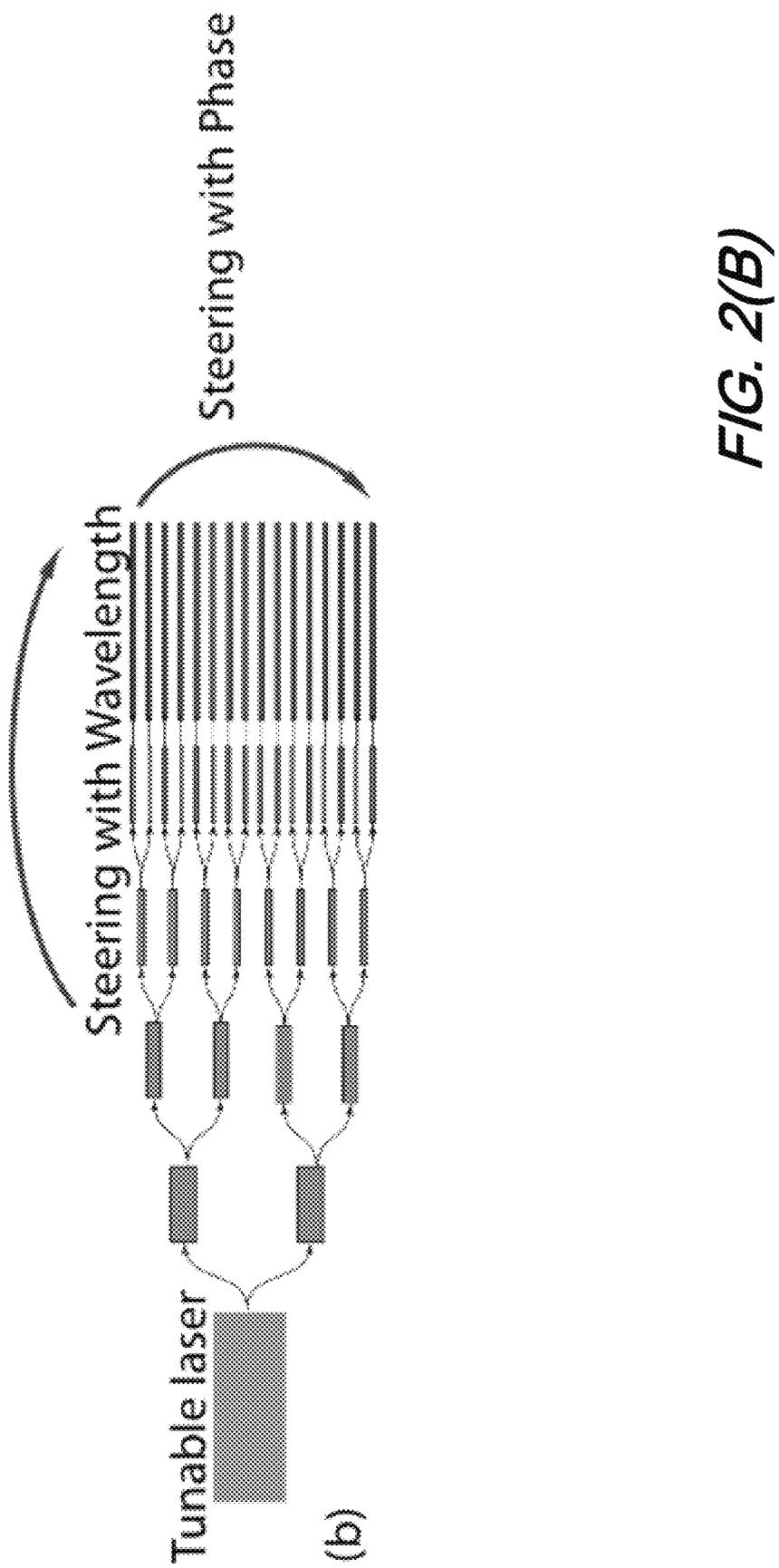
FIG. 2(B) is a schematic diagram of an illustrative one-dimensional array employing both phase and wavelength steering according to aspects of the present disclosure.

To address the packing limitation of the 2D array noted above an alternative arrangement such as that shown in FIG. 2(B) may be employed. As illustratively shown in that figure, a number of emitters elements including phase shifters and optical grating(s) are optically coupled to a tunable laser via a tree-based distribution network. Such an arrangement advantageously provides for both emission steering with phase and emission steering with wavelength.

Operationally, a single laser may feed—via the 1D array—many thousands (or millions) of emitter elements wherein long waveguide gratings gradually emit over their length in an upward direction. The benefit of such a system configuration is that so long as light is sufficiently confined in the waveguides so that they do not cross-couple, the elements can be positioned very close to one another thereby suppressing array factor grating-lobes. As schematically shown in FIG. 2(B), such an array may be steered by the phased control of emitter elements in the cross direction and the steering in the backwards/forwards direction by changing the grating emission induced by laser wavelength change.

Figure 3B:
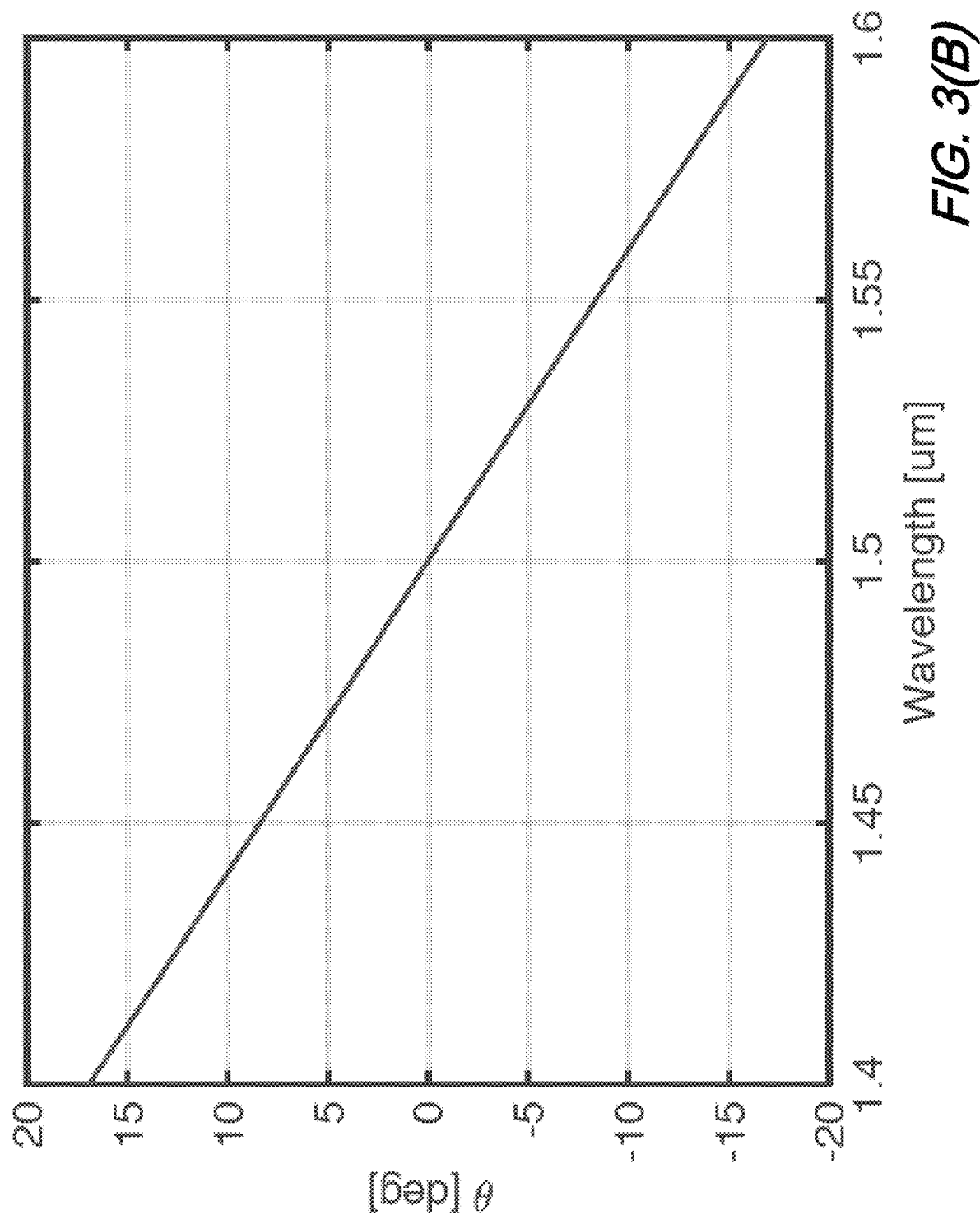
FIG. 3(B) is a plot of angle vs. wavelength illustrating the change in emission angle with wavelength for a silicon waveguide grating according to aspects of the present disclosure.

As will be readily appreciated and understood by those skilled in the art, wavelength steering in a 1D array may be produced by grating emitters and described by the Bragg condition as schematically illustrated in FIG. 3(A)). As may be observed from that figure, by changing the wavelength, the direction of grating emission rotates in the backward and forward direction. As can be seen further from FIG. 3(B)—which shows a plot of $\theta$ (degrees) vs. wavelength (nm) for a silicon waveguide grating—to achieve a large (>30°) sweep range in the up/down direction, a tunable laser source must emit in the entire 1400-1600 nm range. As will be further understood and appreciated by those skilled in the art, semiconductor laser sources used for such applications are typically operated in the range that their gain from multiple quantum well growth provides a low threshold operation. Since the peak of the gain spectrum for such structures is typically narrower than 20nm, expecting an inexpensive distributed feedback (DFB) laser to operate over a 200 nm-wide band is unrealistic.

Given such operational difficulty, systems, methods, and structures according to the present disclosure advantageously employ more than one laser to create the multiple discrete lines of scan in a sideways scan (similar to that illustrated in FIG. 1(B)) in which each laser is responsible for only one of the horizontal lines that are subsequently combined to create a 2D image of the surrounding). As we shall show, utilizing more than one laser advantageously allows each laser to be optimized without the need for more complicated—and less stable—tunable lasers.

Figure 4:
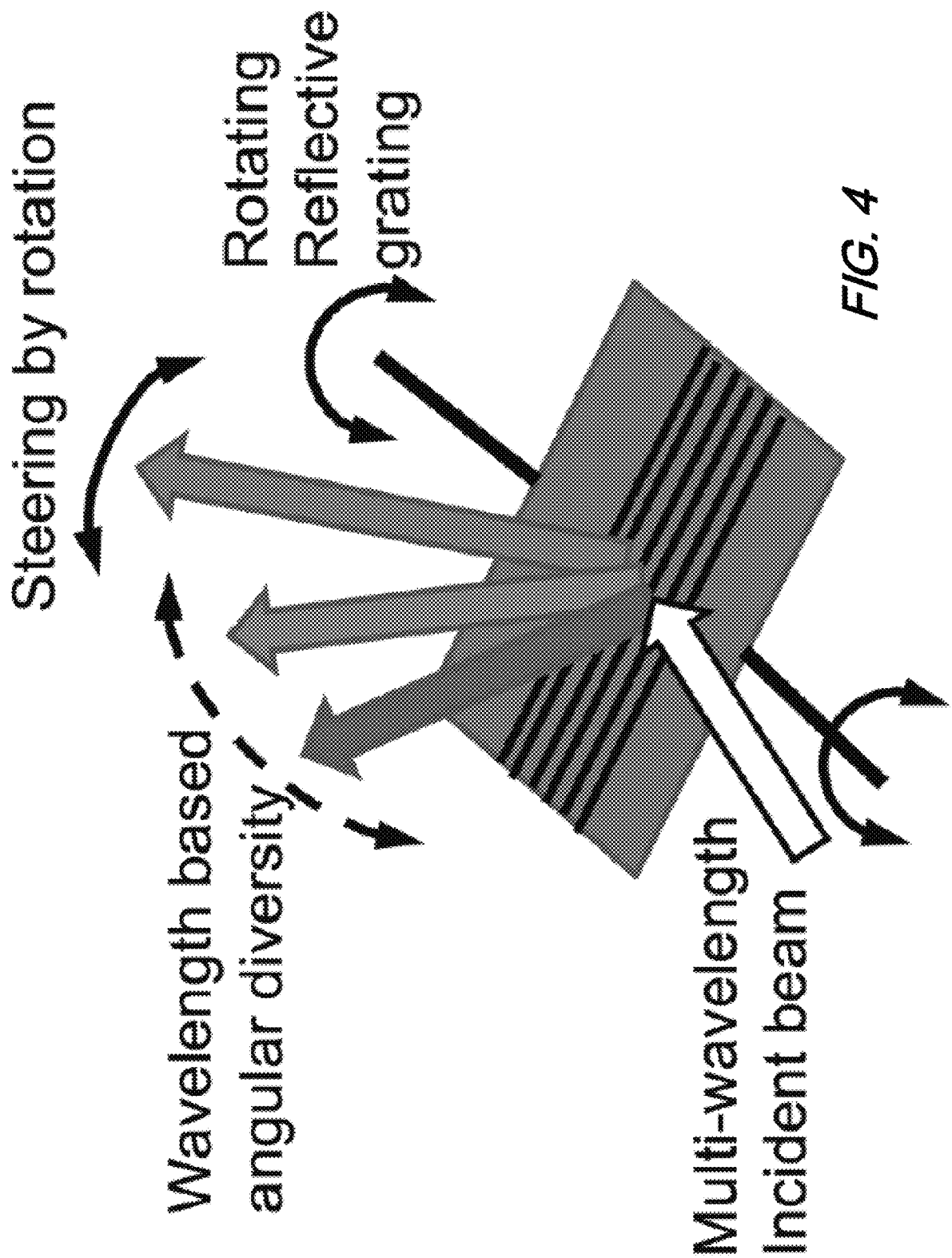
FIG. 4 is a schematic diagram illustrating bulk optics wavelength multiplexed LiDAR with a swiveling reflective grating to create discrete scan lines having wavelength diversity while providing for continuous scanning in another dimension according to aspects of the present disclosure.

With reference now to FIG. 4, there is shown a schematic diagram illustrating a bulk optics, wavelength multiplexed LiDAR system having a swiveling reflective grating to generate discrete scan lines with wavelength diversity while continuously scanning in another dimension—according to aspects of the present disclosure. As may be observed from that figure, a multi-wavelength input signal generated from the output of several independent lasers (not specifically shown) is split into scan lines by the grating. More specifically, the multi-wavelength input signal is incident on the grating that reflects the incident light.

The grating is configured to swivel around its longitudinal axis and affects different wavelengths differently—with the longest wavelength light diffracting the most. The continuous swivel of the grating around its axis scans the beams in a transverse direction.

Figure 5A:
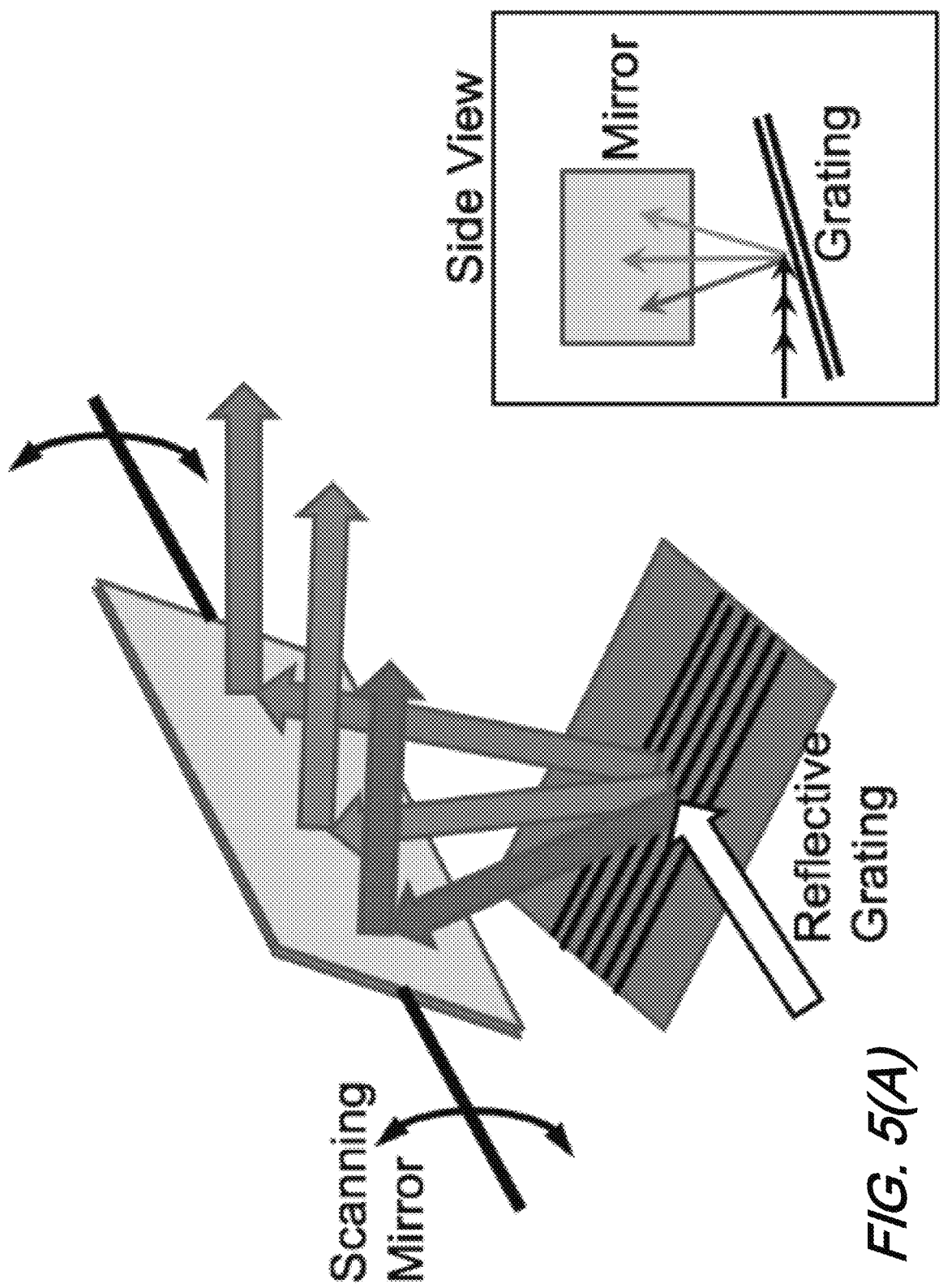
Figure 5B:
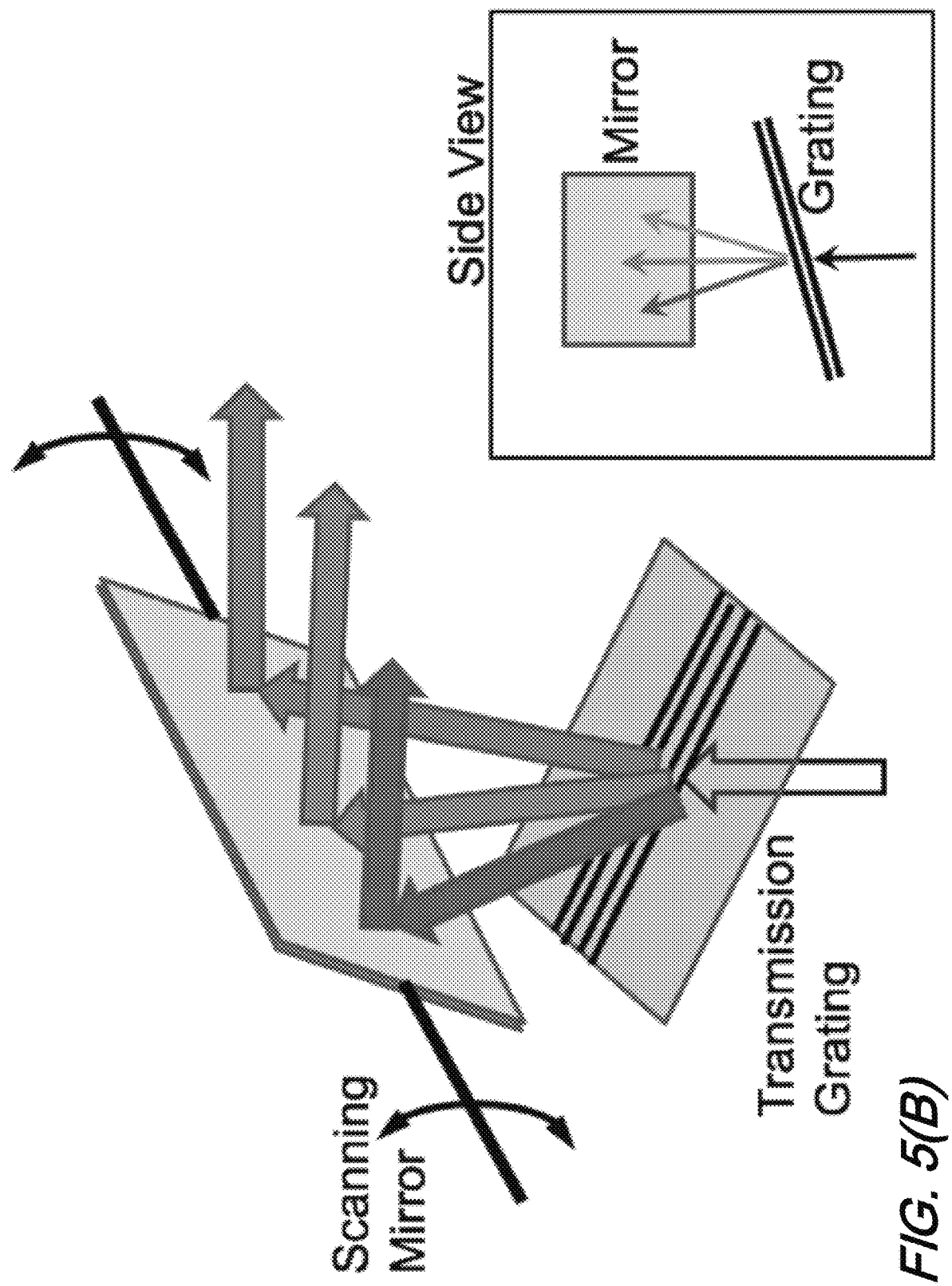

Those skilled in the art will readily appreciate that such structures may be readily implemented in bulk optics and—for simplicity—implemented using a bulk grating and a scanning mirror (i.e., a 45° rotating mirror, 1D MEMS mirror, etc.) to continuously scan in the other dimension as shown schematically in FIG. 5(A) and FIG. 5(B). With simultaneous reference to those figures there is shown a bulk optics wavelength multiplexed LiDAR system with: FIG. 5(A) reflective; and FIG. 5(B) transmission grating(s), to create scan lines with a scanning mirror providing continuous scanning in the other direction.

Operationally, a free space multi-wavelength beam is shown incident upon a grating (i.e., reflective (FIG. 5(A) or transmissive (FIG. 5(B)). The grating splits the beam into separate beams in the grating dimension. These multiple beams are then directed to—and incident upon—a controllable scanning mirror. This scanning mirror provides steering in the other dimension thereby producing a 2D FOV with multiple scan lines, one for each wavelength of input light. Such bulk-optics systems according to the present disclosure allow for 2D scanning with multiple discrete scan lines and single scanning control. The light reflected from the target travels in the same path and due to time-reversal of electromagnetic radiations and different colors of collected light will combine into the same beam after the grating.

To achieve still more compact systems exhibiting higher manufacturability, we disclose further systems, methods, and structures wherein bulk optic elements are replaced by planar integrated optical systems that may advantageously be fabricated with contemporary CMOS compatible fabrication flow(s).

Figure 6:
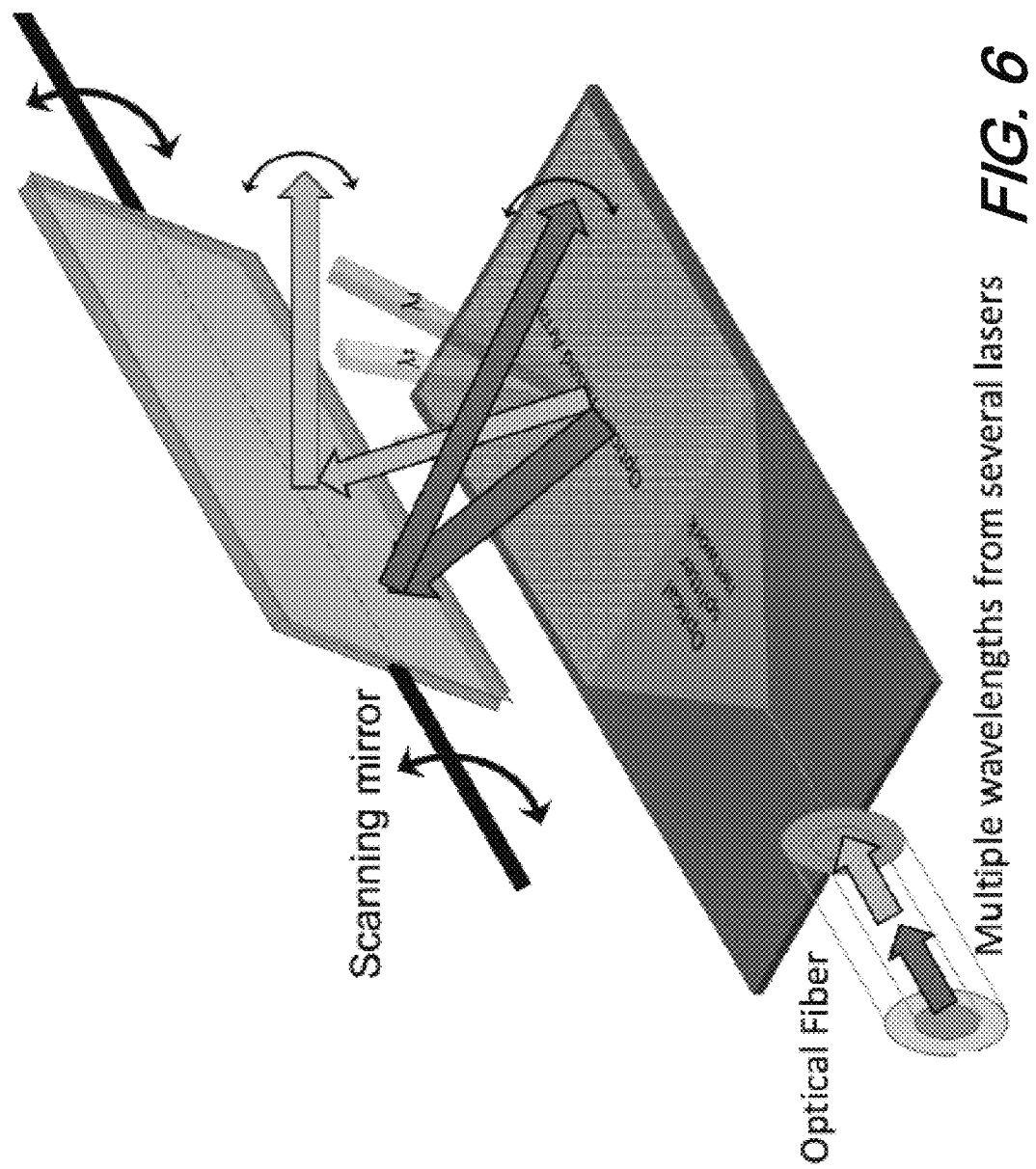
FIG. 6 is a schematic diagram illustrating a semi-integrated wavelength multiplexed LiDAR system with passive phased array to create scan lines with a scanning mirror for continuous scanning in the other dimension according to aspects of the present disclosure.

Turning now to FIG. 6, there is shown a schematic diagram of an illustrative semi-integrated, wavelength multiplexed LiDAR system including a passive phased array that generates scan lines and a movable scanning mirror for continuous scanning in another direction—according to aspects of the present disclosure. As may be understood by inspection of that figure, the bulk grating shown and described previously is advantageously replaced with a 1D optical phased array to split the multi-wavelength input signal into component wavelengths—since the angle of emission of grating-based emitters is highly dependent on wavelength.

Operationally, a multiwavelength optical fiber mode is coupled into an input optical waveguide. The received mode energy is then distributed evenly (or with a Gaussian distribution) among a number of waveguides (i.e., thousands) comprising an optical splitter network. The energy so distributed is directed to an optical phased array of waveguides wherein each waveguide acts as an emitting element with weakly perturbing gratings along the waveguides. Preferably, all laser wavelengths present in the incoming fiber mode are independently distributed amongst the collection of waveguides and do not interact or interfere with one another due to differences between their optical frequencies. As such, the splitter network and any waveguides and splitters are sufficiently wideband to accommodate the entire range of wavelengths employed. Accordingly, the emitting waveguides will directionally emit as a function of wavelength as illustrated previously in FIG. 3(A).

Figure 7:
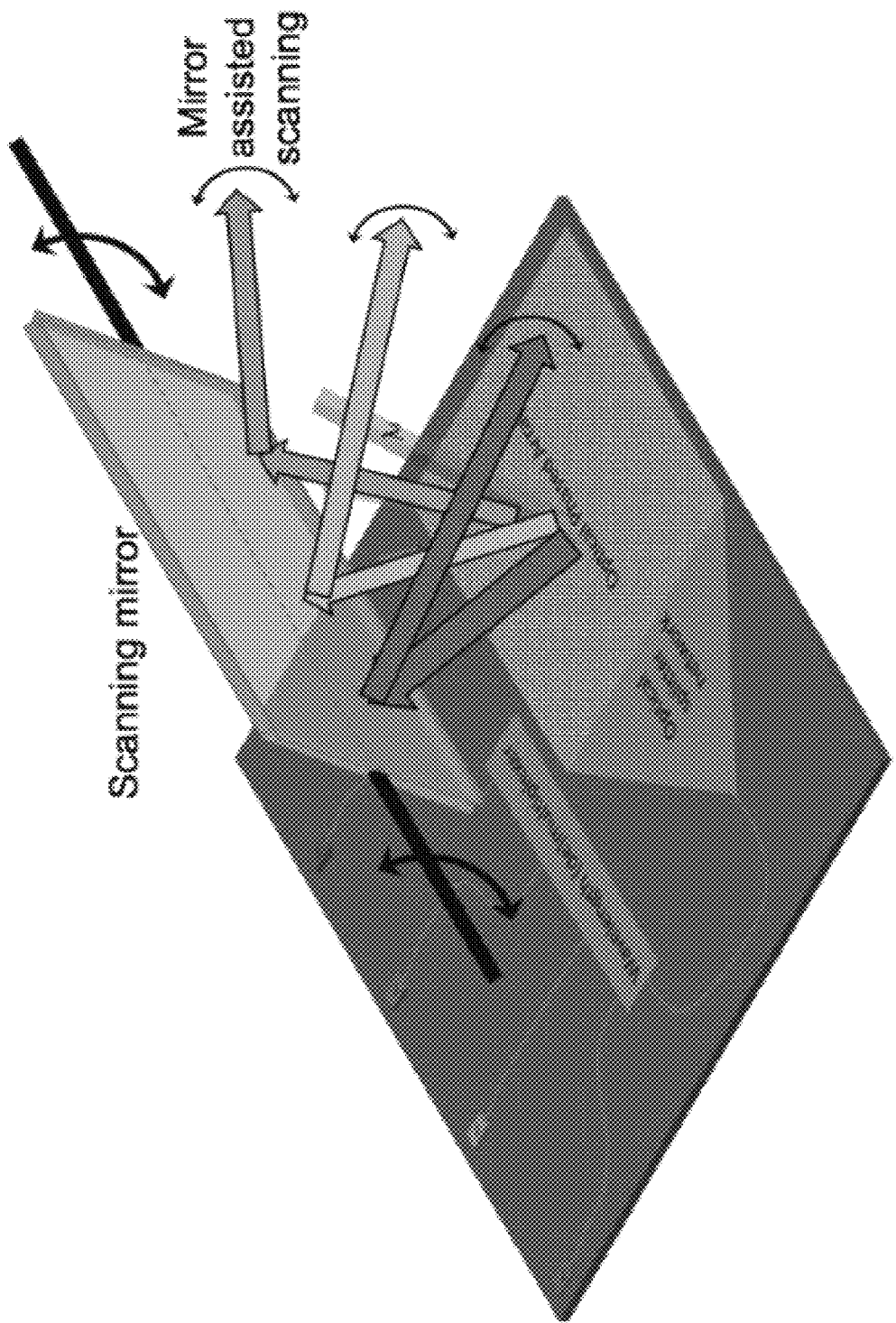
FIG. 7 is a schematic diagram illustrating a semi-integrated wavelength multiplexed LiDAR system with on-chip lasers and wavelength (de)multiplexer to combine to a single input to a passive phased array to create scan lines with a scanning mirror for continuous scanning in the other dimension according to aspects of the present disclosure.

Still further integration according to the present disclosure is achieved by integrating multi-wavelength sources (on-chip lasers) and an integrated wavelength (de)multiplexer along with the grating and optical phased array described previously. FIG. 7 shows another semi-integrated wavelength multiplexed LiDAR system according to the present disclosure having on-chip lasers and wavelength (de)multiplexer to couple a single input to a passive phased array thereby generating scan lines that are subsequently scanned in another direction by a continuously scanning mirror.

Advantageously, lasers may be fabricated with DFB structures exhibiting various grating periods—all on the same substrate or from different quantum well epitaxial growth (to cover a wider range of gain spectrum than that of a single quantum well structure). The output of each lasers is directed into a wavelength (de)multiplexer wherein they are combined into a single multiwavelength signal and subsequently applied to an input of the phased array system—the output of which generates scan lines. As will be known and understood, such (de)multiplexer may advantageously include—but not limited to—resonator filters, Bragg filters, a cascaded Mach-Zehnder, arrayed waveguide gratings (AWG), Echelle gratings, etc.

We note that employing a mirror to provide a sweep in the transverse direction limits the mechanical rigidity and desirable small form factor of a system so constructed. According to still other aspects of the present disclosure, scan lines may be further scanned by employing an on-chip phased array made active by incorporating phase shifters. Advantageously—and assuming that dispersion of the system is low—the scan lines will collectively move (scan) when the phase shifters are controlled in such a manner as to apply a linear phase ramp along the elements of the phased array.

Of further advantage, with such an active chip, LiDAR receivers, for example made from germanium photodetectors, can also be fabricated on-chip and a common (same) phased array may be used as a receiving aperture.

Figure 8:
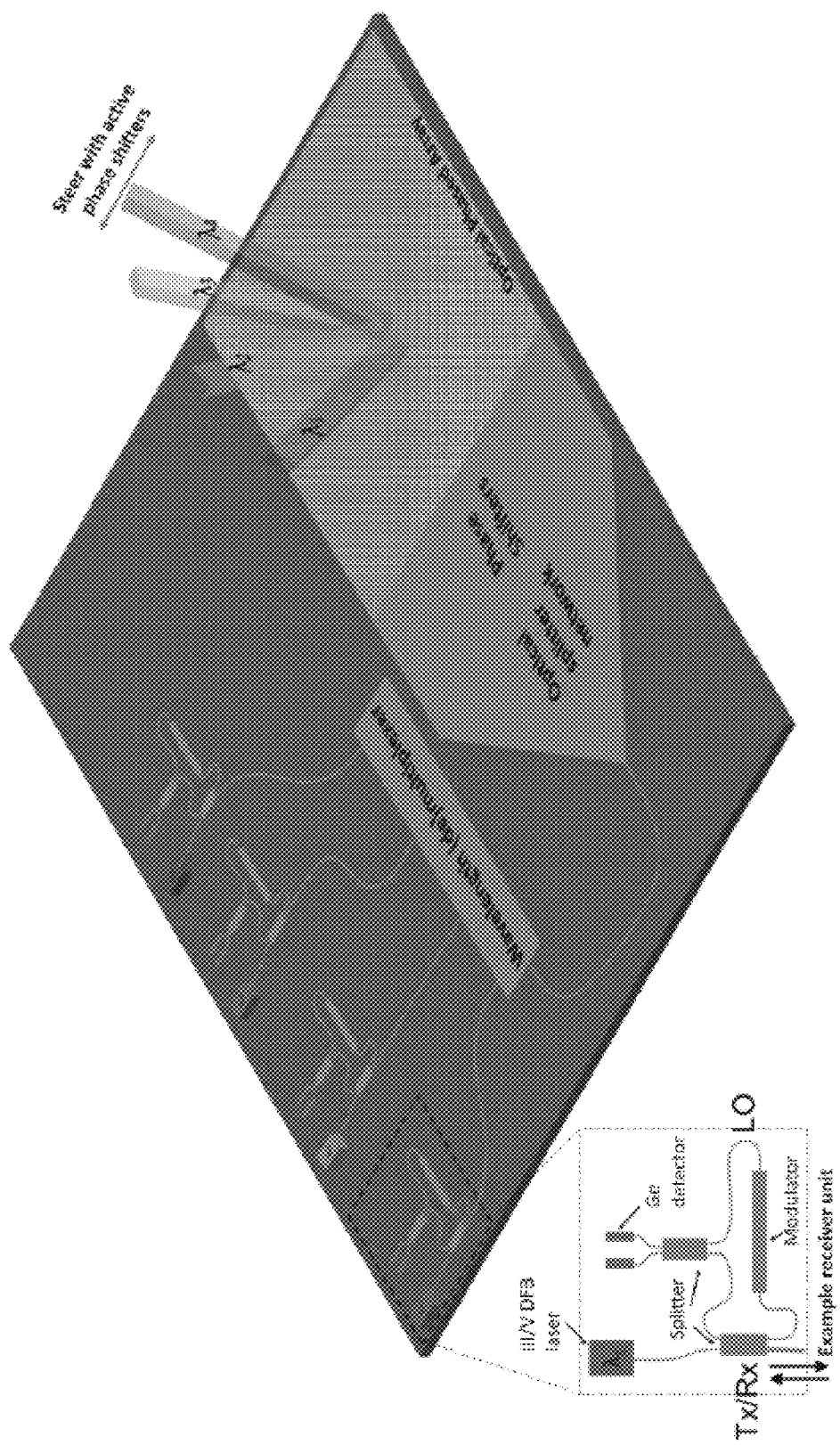
FIG. 8 is a schematic diagram illustrating a fully-integrated wavelength multiplexed LiDAR system with on-chip lasers, wavelength (de) multiplexer, active phased array, and on-chip receivers in which a single aperture is used for transmitting and receiving according to aspects of the present disclosure.

FIG. 8 shows a schematic diagram of an illustrative, fully-integrated wavelength multiplexed LiDAR system with on-chip lasers, wavelength (de)multiplexer, active phased array and on-chip receivers in which a single aperture is used for both transmitting and receiving.

Figure 9:
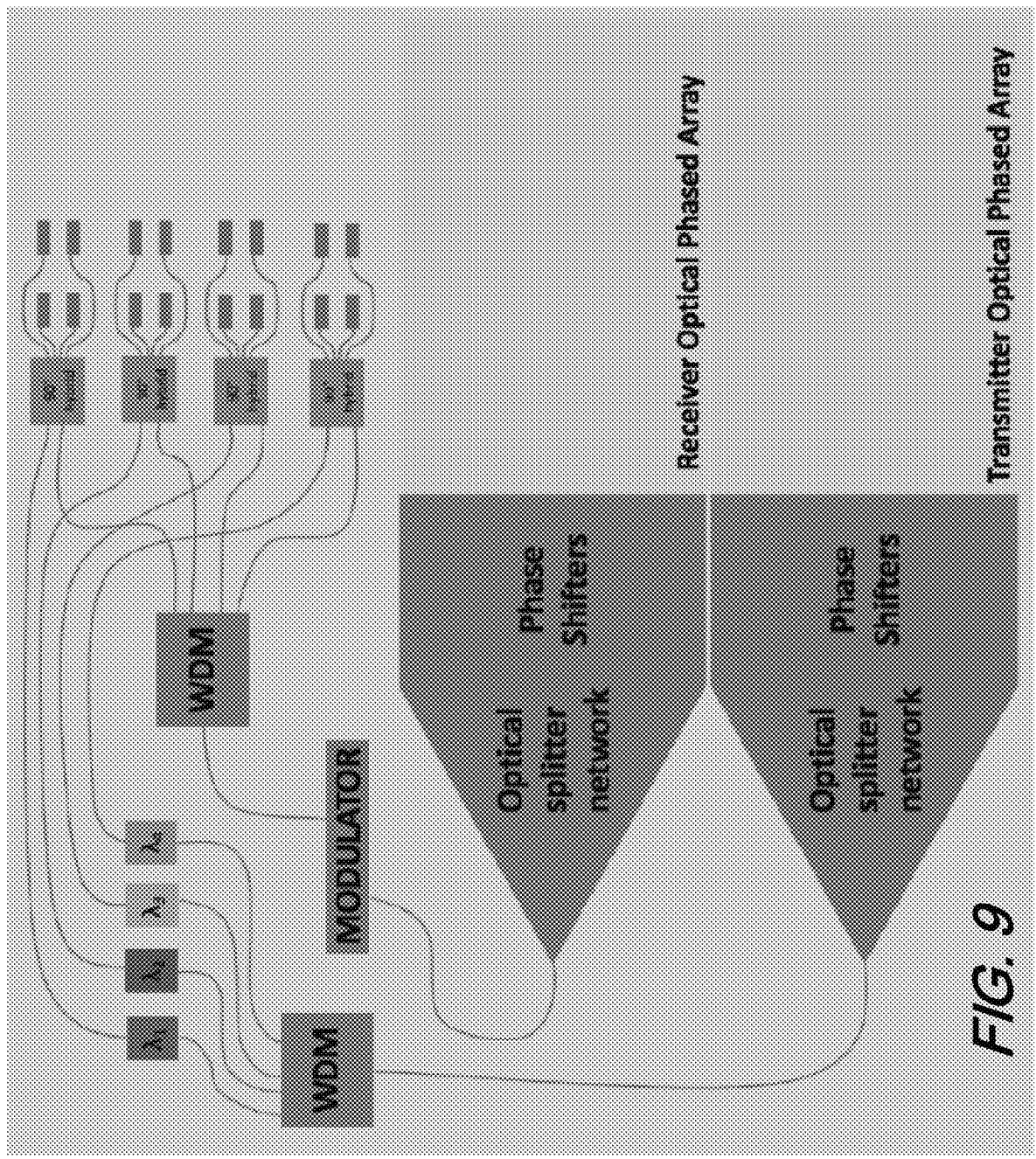
FIG. 9 is a schematic diagram showing an illustrative layout for a fully-integrated wavelength multiplexed LiDAR system with on-chip lasers, wavelength (de) multiplexer, active phased array, and on-chip receivers in which two apertures are used—one for transmitting and one for receiving—according to aspects of the present disclosure.

FIG. 9 shows a schematic diagram of an illustrative, fully-integrated wavelength multiplexed LiDAR system with on-chip lasers, wavelength (de)multiplexer, active phased array, and on-chip receivers in which two apertures are used—one for transmitting and one for receiving.

Advantageously, the same wavelength (de)multiplexer design may be used to demultiplex the received light to the individual receivers associated with a scan line. With the single aperture design, only a single wavelength (de)multiplexer is needed. With the dual aperture design, two wavelength (de)multiplexers are used, one for each aperture.

In the single aperture design shown in FIG. 8, the output of a laser is directed through a 50/50 (or electronically tunable) splitter, such that one split portion of the laser light is (optionally) modulated and subsequently used as a local oscillator (LO), while the other split portion of the laser light is applied into a mux/demux (such as a AWG) to be combined with other laser lights—each exhibiting a different wavelength—and subsequently directed into a single waveguide. The single waveguide carrying all these wavelengths is directed into a phased array, from which several individual beams are emitted. Emitted light that subsequently strikes an object will scatter back toward the phased array aperture, where it is received and coupled back into the single waveguide.

Note that at each moment in time, the phased array emits each wavelength in one direction in space while also "staring" in the same direction for that specific wavelength. As a result—when several lasers are employed—the phased array is illuminating and observing several points in space simultaneously and any backscattered, received light is identified from its wavelength.

For this unique identification, the backscattered light traverses through the same (de)multiplexer circuits that combined the laser light(s) prior to emission; different wavelength components are separated; and each component is directed toward the laser from which it was originally emitted and is still in coherence with. Similarly, the same 50/50 (or electronically tunable) splitter that initially separated a portion of the laser light as the local oscillator, now directs a portion of the backscattered light toward a receiver.

Such receivers may advantageously be coherent frequency-modulated continuous-wave (FMCW) LiDAR receivers including a local oscillator that is tapped from the respective laser. Alternative configurations may employ avalanche photodiodes to detect a received pulsed signal. In the case of FMCW, the receiver is a heterodyne detection unit comprising a four port 3 dB coupler, a pair of detectors, and two inputs for the local oscillator and the backscattered light. Of further advantage, the local oscillator light can be modulated to an intermediate frequency to avoid any 1/f baseband noise.

In an illustrative dual aperture configuration according to still further aspects of the present disclosure such as that shown in FIG. 9, several lasers are employed, and their light is combined and directed into a single waveguide using a WDM (such as an AWG or multiple micro-ring filter bank). Unlike the WDM of the single aperture system described previously, this WDM unit does not demultiplex a return signal.

Operationally, at each moment in time, several emitted beams each having a different wavelength exit an aperture in a direction as determined by their wavelength and the phase configuration of the emitting phased array. The receive aperture—on the other hand—observes several points in the FOV for this dual aperture configuration. The phase of the receive aperture elements are preferably adjusted such that at each point in time—for all wavelengths—the receive phased array is observing the exact same point in the far field as the direction of the send aperture is pointed toward for that wavelength. Advantageously, send and receive aperture can be configured in exactly the same manner (with the same phase function for all elements at each moment in time), or can be configured slightly different so that any unwanted side modes of the array factor for the send and receive apertures are not aligned when their main beams are directed in the same direction.

Any light collected by the receive aperture is coupled into a single waveguide, directed through a demultiplexer substantially identical to the one used for the transmit signal, and each of now separated backscattered wavelengths is directed toward its separate receiving unit.

In the case of a heterodyne detection scheme, a portion of the emitted light from each laser source is also directed into the specific receiver designed and/or configured for that wavelength. Note that (as shown in FIG. 8), depending on how receiver units are configured, local oscillator light must traverse waveguide crossings to reach the receivers and it is therefore important that any loss for the collected backscattered light be kept to a minimum to achieve the highest signal to noise ratio (SNR).

Figure 10:
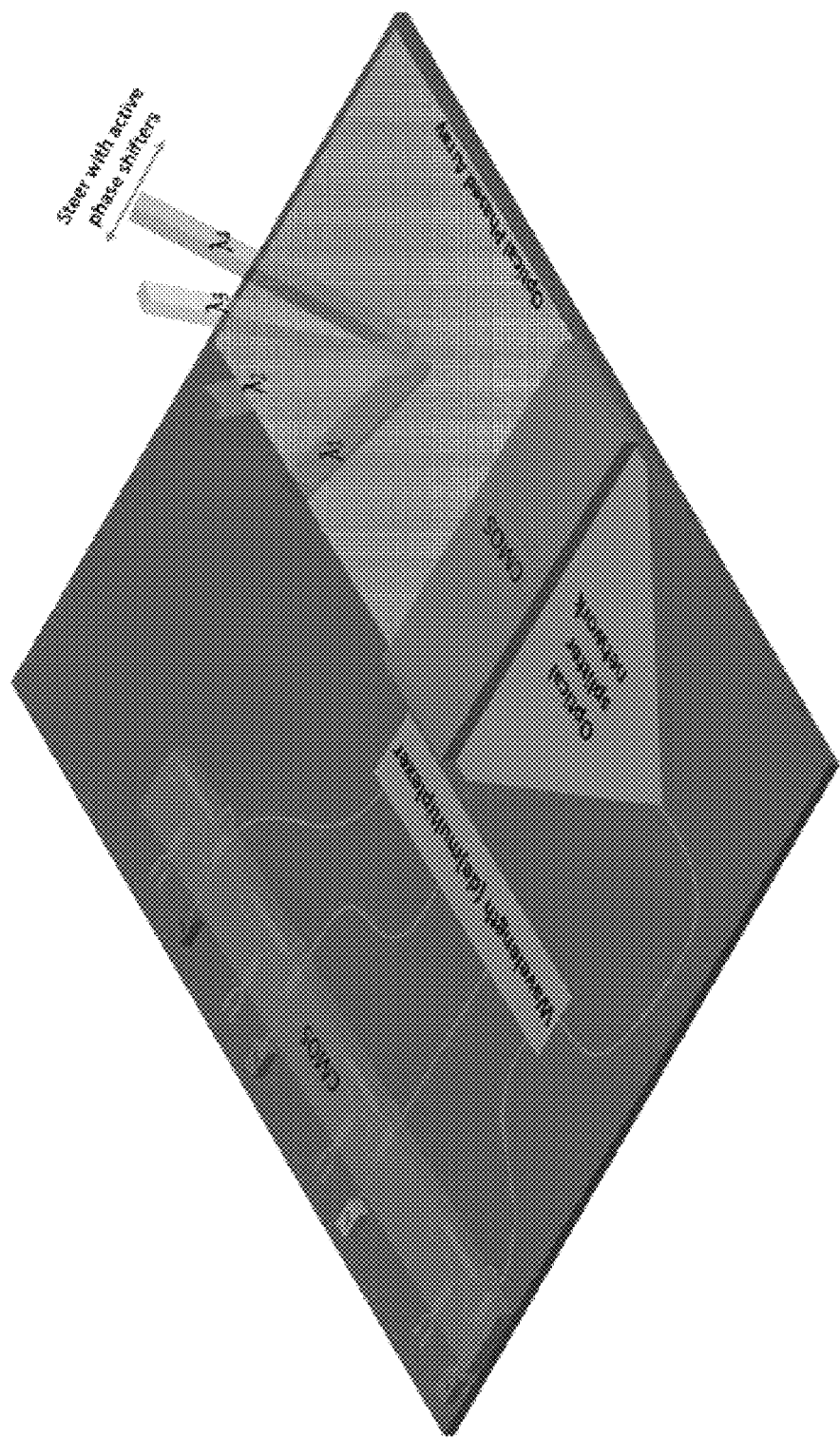
FIG. 10 is a schematic diagram showing an illustrative layout for a fully-integrated wavelength multiplexed LiDAR system with on-chip lasers, wavelength (de) multiplexer, optical splitter network, active phased array with integrated face-to-face CMOS electronics providing full WDM LiDAR system on a chip—according to aspects of the present disclosure.

Finally, we note that when all photonic components are integrated onto a single chip (chip-scale integration), CMOS electronics may be included as drivers according to still further aspects of the present disclosure (fully integrated chip-scale). FIG. 10 is a schematic diagram showing an illustrative layout of additional face-to-face CMOS electronics on a WDM Lidar system thereby providing a full LiDAR on a chip configuration. Note that such a flip-chip, face-to-face configuration may be monolithically integrated onto a single die, or in a 3D heterogeneous platform with wafer-scale bonding. Both the photonics and CMOS chips can also rest on a transposer chip carrying the electronic signals from the CMOS drivers to the photonics chip and also carrying the detected electronic signals from the photodetectors to amplifiers—such as transimpedance amplifiers (TIAs)—and the processing unit. Those skilled in the art will appreciate that such addition of CMOS electronics according to aspects of the present disclosure creates a truly chip-scale LiDAR system with a 2D FOV employing multiple scan lines and steering in a single dimension.

At this point, while we have presented this disclosure using some specific examples, those skilled in the art will recognize that our teachings are not so limited. Accordingly, this disclosure should be only limited by the scope of the claims attached hereto.

The invention claimed is:

1. A method of operating a chip-scale wavelength division multiplexed LiDAR comprising:
   providing a multiwavelength optical signal;
   directing the multiwavelength optical signal via a distribution network to an optical phased array, said optical phased array including grating emitters and phase shifters;
   separating the multiwavelength optical signal into its component wavelengths through the effect of the grating emitters and emitting the individual component wavelengths as individual beams in an individual direction toward a scene according to their wavelength, where said individual beam directions span an emission plane; and
   steering the individual beams through the effect of the phase shifters, said individual beams collectively steered about an axis substantially parallel to the emission plane.

2. The method of claim 1 further comprising:
receiving at least a portion of the individual beams after the portion of the individual beams are reflected by an object in the scene.

3. The method of claim 2 further comprising:
determining a distance between the object and the chip-scale wavelength division multiplexed LiDAR.

4. A wavelength division multiplexed LiDAR system comprising:
a multiwavelength source that outputs a multiwavelength beam; and
a grating that separates the multiwavelength beam into individual beams, each individual beam exhibiting a different wavelength; and
a rotating scanning mirror that redirects the individual beams into individual scan lines, each individual scan line exhibiting the different wavelength of the individual beam redirected.

5. The wavelength division multiplexed LiDAR system of claim 4 wherein the grating is one selected from the group consisting of: reflective grating and transmission grating.

6. The wavelength division multiplexed LiDAR system of claim 4 wherein the rotating scanning mirror is a microelectromechanical system (MEMS) mirror.

7. The wavelength division multiplexed LiDAR system of claim 4 wherein the grating comprises an optical phased array including grating-based emitters and the system further comprises an optical fiber that receives the multiwavelength beam and an optical splitter network that optically connects the optical fiber to the optical phased array, said optical splitter network configured to evenly distribute mode energy of the multiwavelength beam among the optical phased array emitters.

8. The wavelength division multiplexed LiDAR system of claim 7 further comprising:
a single substrate onto which is fabricated the multiwavelength source, the optical splitter network and the optical phased array.

9. The wavelength division multiplexed LiDAR system of claim 8 wherein the multiwavelength source includes a plurality of individual lasers, each one of the individual lasers configured to emit light at a different wavelength; and
a wavelength multiplexer that combines the light emitted from the individual lasers into the multiwavelength beam and applies that multiwavelength beam to the optical splitter network.

10. A wavelength division multiplexed LiDAR system comprising:
a substrate;
a multiwavelength light source formed on the substrate;
an active optical phased array formed on the substrate, said active optical phased array including phase shifters and grating emitters;
an optical splitter network formed on the substrate, said optical splitter network optically connecting the multiwavelength light source to the active optical phased array; and
a plurality of transmitter/receiver (TX/RX) units formed on the substrate, wherein each individual TX/RX unit is configured to generate an individual wavelength of the multiwavelength light source and to detect that same individual wavelength.

11. The wavelength division multiplexed LiDAR system of claim 10 further comprising a wavelength multiplexer interposed between the plurality of TX/RX units and the optical splitter network, said multiplexer configured to combine the individual wavelengths of the TX/RX units into a multiwavelength beam provide that multiwavelength beam to the optical splitter network.

12. The wavelength division multiplexed LiDAR system of claim 11 further configured to separate and directionally emit the multiwavelength beam according to its wavelength through the effect of the grating emitters and to orthogonally steer the directionally emitted light by adjusting the phase shifters.

13. The wavelength division multiplexed LiDAR system of claim 12 wherein the directionally emitted and orthogonally steered light is backscattered by an object, received by selective emitters of the active optical phased array and directed to a respective TX/RX unit based upon its wavelength.

14. The wavelength division multiplexed LiDAR system of claim 13 further comprising a separate transmitter optical phased array that emits light and a separate receiver optical phased array that receives the backscattered light.

15. The wavelength division multiplexed LiDAR system of claim 14 wherein the receiver optical phased array directs received light to a modulator and into a wavelength demultiplexer for subsequent detection by a plurality of detectors, one for each wavelength emitted.

16. A wavelength division multiplexed LiDAR method comprising:
providing a multiwavelength beam;
separating that multiwavelength beam into individual beams, each individual beam exhibiting a different wavelength of the multiwavelength beam and being emitted in an individual direction according to their wavelength, where said individual beam directions span an emission plane; and
steering the individual beams through phase control of the individual beams, said individual beams collectively steered about an axis substantially parallel to the emission plane.

17. The method of claim 16 further comprising:
operating a plurality of laser light sources, each individual one of the plurality of laser light sources emitting light at a different wavelength; and
combining the plurality of different wavelength light into the multiwavelength beam.

18. A wavelength division multiplexed LiDAR system comprising:
a substrate;
a light source integrated with the substrate providing a multiwavelength optical signal;
an active optical phased array formed on the substrate, said active optical phased array including phase shifters and grating emitters;
an optical splitter network formed on the substrate, said optical splitter network optically connecting the multiwavelength optical signal to the active optical phased array; and
driver electronics configured to control phase shifts applied by the phase shifters to steer individual beams exhibiting different wavelengths emitted in individual directions that span an emission plane such that said individual beams are collectively steered about an axis substantially parallel to the emission plane.

* * * * *

UNITED STATES PATENT AND TRADEMARK OFFICE
CERTIFICATE OF CORRECTION

PATENT NO.        : 11,061,140 B2
APPLICATION NO.   : 15/963032
DATED             : July 13, 2021
INVENTOR(S)       : Ehsan Hosseini et al.

It is certified that error appears in the above-identified patent and that said Letters Patent is hereby corrected as shown below:

In the Specification

At Column 1, Line number 12, before the "TECHNICAL FIELD", please insert the following paragraph:
--STATEMENT AS TO FEDERALLY SPONSORED RESEARCH
This invention was made with government support under contract no. HR0011-16-C-0108 awarded by DARPA. The government has certain rights in the invention.--

Signed and Sealed this
Sixth Day of June, 2023

Katherine Kelly Vidal
*Director of the United States Patent and Trademark Office*